US012625800B1

(12) United States Patent
Uphale et al.

(10) Patent No.: US 12,625,800 B1
(45) Date of Patent: May 12, 2026

(54) DATA STORAGE DEVICE AND METHOD FOR DIRECT DATA QUANTIZATION IN MULTI-LEVEL-CELL MEMORY

(71) Applicant: Sandisk Technologies, Inc., Milpitas, CA (US)

(72) Inventors: Snehal Vithal Uphale, Bangalore (IN); Ramanathan Muthiah, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 14 days.

(21) Appl. No.: 18/945,932

(22) Filed: Nov. 13, 2024

(51) Int. Cl.
*G06F 12/02* (2006.01)
(52) U.S. Cl.
CPC ................................ *G06F 12/0223* (2013.01)
(58) Field of Classification Search
CPC .................................................. G06F 12/0223
See application file for complete search history.

(56) References Cited

U.S. PATENT DOCUMENTS 9,395,927 B2    7/2016  Pekny
11,853,572 B2   12/2023  Gopalakrishnan et al.
2021/0132818 A1  5/2021  Hallak et al.

FOREIGN PATENT DOCUMENTS

KR        101206820     6/2012

OTHER PUBLICATIONS

Yue et al., Reducing Read Latency in MLC PCM, 2016, IEEE, 6 pages (Year: 2016).*
U.S. Appl. No. 18/230,576, filed Aug. 4, 2023 entitled "Computational Storage Device with Computation Precision-Defined Fixed Point Data Grouping and Storage Management."
Brookes, Tim; "What Is Dynamic Resolution Scaling (DRS)?"; downloaded from the Internet on Nov. 13, 2024 at https://www.howtogeek.com/764408/what-is-dynamic-resolution-scaling-drs/; Nov. 14, 2021; How-To Geek; Valnet Publishing Group; 8 pages.
Ponti, M. et al.; "Compact Color Features with Bitwise Quantization and Reduced Resolution for Mobile Processing"; downloaded from the Internet on Nov. 13, 2024 at Ponti_MobileImagingSIP2013.pdf; InProceedings 2013; 4 pages.
"TensorFlow: An end-to-end platform for machine learning"; product page; downloaded from the Internet on Nov. 13, 2024 at https://www.tensorflow.org; Oct. 28, 2024; 10 pages.

(Continued)

*Primary Examiner* — Gary W. Cygiel
(74) *Attorney, Agent, or Firm* — Crowell & Moring LLP

(57) ABSTRACT

In a data storage device with a multi-level-cell memory, bits of data are stored in different levels of each of the memory cells. In some situations, a quantized version of the stored data (e.g., the most-significant bits) may be requested. Responding to such a request can involve reading all levels of the memory cells to retrieve a full version of the data and then selectively providing only the quantized version. To improve performance, the data is stored in the memory in an interleaved manner in which the quantized version of the data is stored in the same level(s) instead of being spread across all levels of the memory cells. That way, when the quantized version of the data is later requested, only the relevant level(s) are sensed, thereby avoiding the time and resources needed to read memory level(s) that do not store the quantized data.

19 Claims, 17 Drawing Sheets

(56) References Cited

OTHER PUBLICATIONS

Wang, Cheng et al.; "Channel Modeling and Quantization Design for 3D NAND Flash Memory"; Entropy, vol. 25; Jun. 21, 2023; 17 pages.

U.S. Appl. No. 19/035,262, filed Jan. 23, 2025 entitled "Data Storage Device and Method for Non-Balanced Mapping for Variable Read Resolution."

U.S. Appl. No. 19/035,315, filed Jan. 23, 2025 entitled "Data Storage Device and Method for Bit Error Rate (BER) Balancing Based on Dynamic Sense Time."

Courbariaux, Matthieu et al.; "Binarized Neural Networks: Training Neural Networks with Weights and Activations Constrained to +1 or −1"; downloaded from the Internet on Jan. 23, 2025 at https://arxiv. org/abs/1602.02830; arXiv:1602.02830; Feb. 9, 2016; 11 pages.

Jiang, Chutian; "Efficient Quantization Techniques for Deep Neural Networks"; downloaded from the Internet on Jan. 23, 2025 at https://ieeexplore.ieee.org/document/9707043; 2021 International Conference on Signal Processing and Machine Learning (CONF-SPML); Stanford, California; Nov. 14, 2021; 7 pages.

Mishra, Rahul et al.; "A Survey on Deep Neural Network Compression: Challenges, Overview, and Solutions"; downloaded from the Internet on Jan. 23, 2025 at https://arxiv.org/abs/2010.03954; arXiv:2010.03954; Oct. 5, 2020; 19 pages.

Peng, Fu et al.; "Training Quantized Deep Neural Networks via Cooperative Coevolution"; downloaded from the Internet on Jan. 23, 2025 at https://arxiv.org/pdf/2112.14834; arXiv:2112.14834v3; InInternational Conference on Sensing and Imaging; Jun. 26, 2022; 13 pages.

"Quantization"; Guidance documentation webpage; downloaded from the Internet on Jan. 23, 2025 at https://pytorch.org/docs/stable/quantization.html; The Linux Foundation. PyTorch Contributors: 2023: 15 pages.

* cited by examiner

TO HOST

NON-VOLATILE
STORAGE SYSTEM

CONTROLLER  102

100

104  NON-VOLATILE
MEMORY

STORAGE MODULE
200

TO HOST

202  STORAGE
CONTROLLER

204

102 CONTROLLER    102 CONTROLLER    102 CONTROLLER 100              100              100

104 NVM          104 NVM          104 NVM

252 HOST    • • •    HOST 252    HIERARCHICAL STORAGE
SYSTEM
250

202 STORAGE    • • •    202 STORAGE
CONTROLLER            CONTROLLER

204 STORAGE    • • •    204 STORAGE
SYSTEM            SYSTEM

| Page | Sensing steps |
|------|---------------|
| Top page | 4 |
| Upper page | 3 |
| Middle page | 4 |
| Lower page | 4 |

FIG. 5

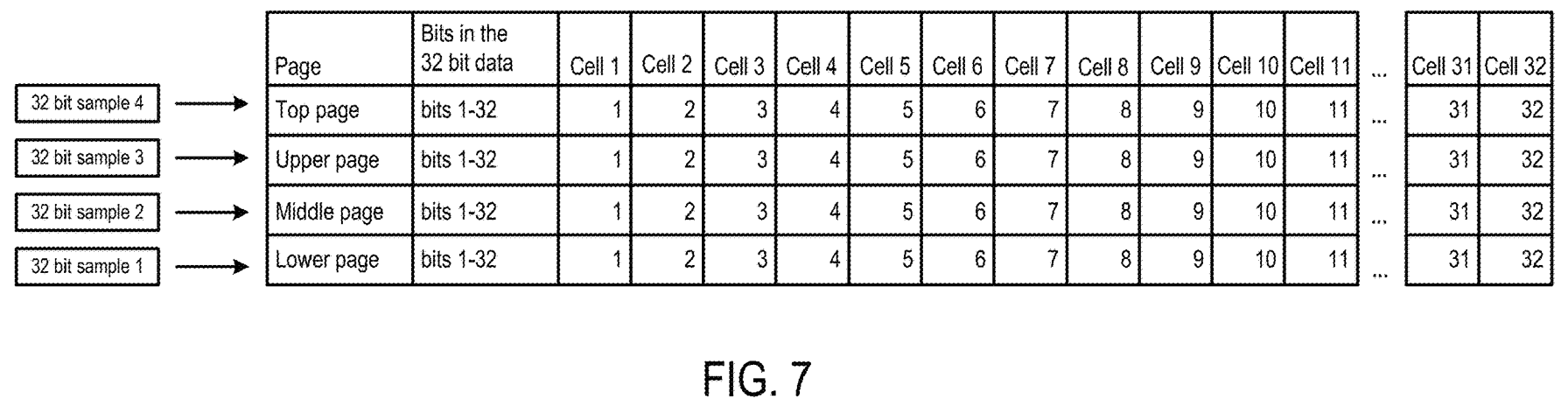

| Page | Bits in the 32 bit data | Cell 1 | Cell 2 | Cell 3 | Cell 4 | Cell 5 | Cell 6 | Cell 7 | Cell 8 | Cell 9 | Cell 10 | Cell 11 | | Cell 31 | Cell 32 |
|---|---|---|---|---|---|---|---|---|---|---|---|---|---|---|---|
| Top page | bits 1-32 | 1 | 2 | 3 | 4 | 5 | 6 | 7 | 8 | 9 | 10 | 11 | ⋮ | 31 | 32 |
| Upper page | bits 1-32 | 1 | 2 | 3 | 4 | 5 | 6 | 7 | 8 | 9 | 10 | 11 | ⋮ | 31 | 32 |
| Middle page | bits 1-32 | 1 | 2 | 3 | 4 | 5 | 6 | 7 | 8 | 9 | 10 | 11 | ⋮ | 31 | 32 |
| Lower page | bits 1-32 | 1 | 2 | 3 | 4 | 5 | 6 | 7 | 8 | 9 | 10 | 11 | ⋮ | 31 | 32 |

32 bit sample 4

32 bit sample 3

32 bit sample 2

32 bit sample 1

FIG. 7

| Page | 8 bit data from 32 bit input | Cell 1 | Cell 2 | Cell 3 | Cell 4 | Cell 5 | Cell 6 | Cell 7 | Cell 8 |
|---|---|---|---|---|---|---|---|---|---|
| Top page | bits 25-32 | 25 | 26 | 27 | 28 | 29 | 30 | 31 | 32 |
| Upper page | bits 17-24 | 17 | 18 | 19 | 20 | 21 | 22 | 23 | 24 |
| Middle page | bits 9-16 | 9 | 10 | 11 | 12 | 13 | 14 | 15 | 16 |
| Lower page | bits 1-8 | 1 | 2 | 3 | 4 | 5 | 6 | 7 | 8 |

Interleaving 32 bit sample to be stored

FIG. 8

| Page | 8 bit data from 32 bit input | Cell 1 | Cell 2 | Cell 3 | Cell 4 | Cell 5 | Cell 6 | Cell 7 | Cell 8 |
|---|---|---|---|---|---|---|---|---|---|
| Top page | bits 25-32 | 17 | 18 | 19 | 20 | 21 | 22 | 23 | 24 |
| Upper page | bits 17-24 | 25 | 26 | 27 | 28 | 29 | 30 | 31 | 32 |
| Middle page | bits 9-16 | 9 | 10 | 11 | 12 | 13 | 14 | 15 | 16 |
| Lower page | bits 1-8 | 1 | 2 | 3 | 4 | 5 | 6 | 7 | 8 |

32 bit sample to be stored

Interleaving

FIG. 9

| Page | 8 bit data from 32 bit input | Cell 1 | Cell 2 | Cell 3 | Cell 4 | Cell 5 | Cell 6 | Cell 7 | Cell 8 |
|------|------|------|------|------|------|------|------|------|------|
| Top page | bits 25-32 | 25 | 26 | 27 | 28 | 29 | 30 | 31 | 32 |
| Upper page | bits 17-24 | 17 | 18 | 19 | 20 | 21 | 22 | 23 | 24 |
| Middle page | bits 9-16 | 9 | 10 | 11 | 12 | 13 | 14 | 15 | 16 |
| Lower page | bits 1-8 | 1 | 2 | 3 | 4 | 5 | 6 | 7 | 8 |

Interleaving 32 bit data to be stored

FIG. 10

| Page | Sensing steps |
|------|---------------|
| Top page | 4 |
| Upper page | 3 |
| Middle page | 4 |
| Lower page | 4 |

DATA STORAGE DEVICE AND METHOD FOR DIRECT DATA QUANTIZATION IN MULTI-LEVEL-CELL MEMORY

BACKGROUND

Computational resource requirements of artificial intelligence (AI) systems are typically high. A device that processes data and derives inferences using an AI engine should have sufficient computational, network, and storage bandwidth. Good storage throughput is desired to continuously feed data to an AI model so that it can perform optimally. In resource-constrained devices (such as security cameras, smart phones and edge devices), a lack of storage bandwidth can severely impact AI performance.

BRIEF DESCRIPTION OF THE DRAWINGS

FIG. 5 is a table illustrating an example coding scheme of an embodiment.

FIG. 7 is a table illustrating an example storage method of an embodiment.

FIG. 8 is a table illustrating an example storage method of an embodiment.

FIG. 9 is a table illustrating an example storage method of an embodiment.

FIG. 10 is a table illustrating an example storage method of an embodiment.

DETAILED DESCRIPTION

The following embodiments generally relate to a data storage device and method for direct data quantization in multi-level cell memory. In one embodiment, a data storage device is provided comprising a memory comprising multi-level memory cells and one or more processors. The one or more processors, individually or in combination, are configured to: receive a request to store data; and store the data in the multi-level memory cells, wherein each bit of a set of most-significant bits of the data is stored in a same memory cell level in each respective multi-level memory cell.

In another embodiment, a method is provided that is performed in a data storage device comprising multi-level memory cells. The method comprises: interleaving data in the multi-level memory cells such that each bit of a set of most-significant bits of the data is stored in a first memory cell level in each respective multi-level memory cell; receiving a request for a quantized version of the data; and in response to receiving the request for the quantized version of the data: sensing the first memory cell level in each respective multi-level memory cell without sensing at least one other memory cell level in each respective multi-level memory cell; and responding to the request by returning bits sensed from the first memory cell level in each respective multi-level memory cell.

In yet another embodiment, a data storage device is provided comprising: a memory comprising multi-level memory cells; and means for reducing sense time to read a quantized version of data stored in the memory by storing each bit of a set of most-significant bits of the data in a same memory cell level in each respective multi-level memory cell.

Other embodiments are possible, and each of the embodiments can be used alone or together in combination. Accordingly, various embodiments will now be described with reference to the attached drawings.

EMBODIMENTS

The following embodiments relate to a data storage device (DSD). As used herein, a "data storage device" refers to a non-volatile device that stores data. Examples of DSDs include, but are not limited to, hard disk drives (HDDs), solid state drives (SSDs), tape drives, hybrid drives, etc. Details of example DSDs are provided below.

Figures 1A, 1B, 1C:
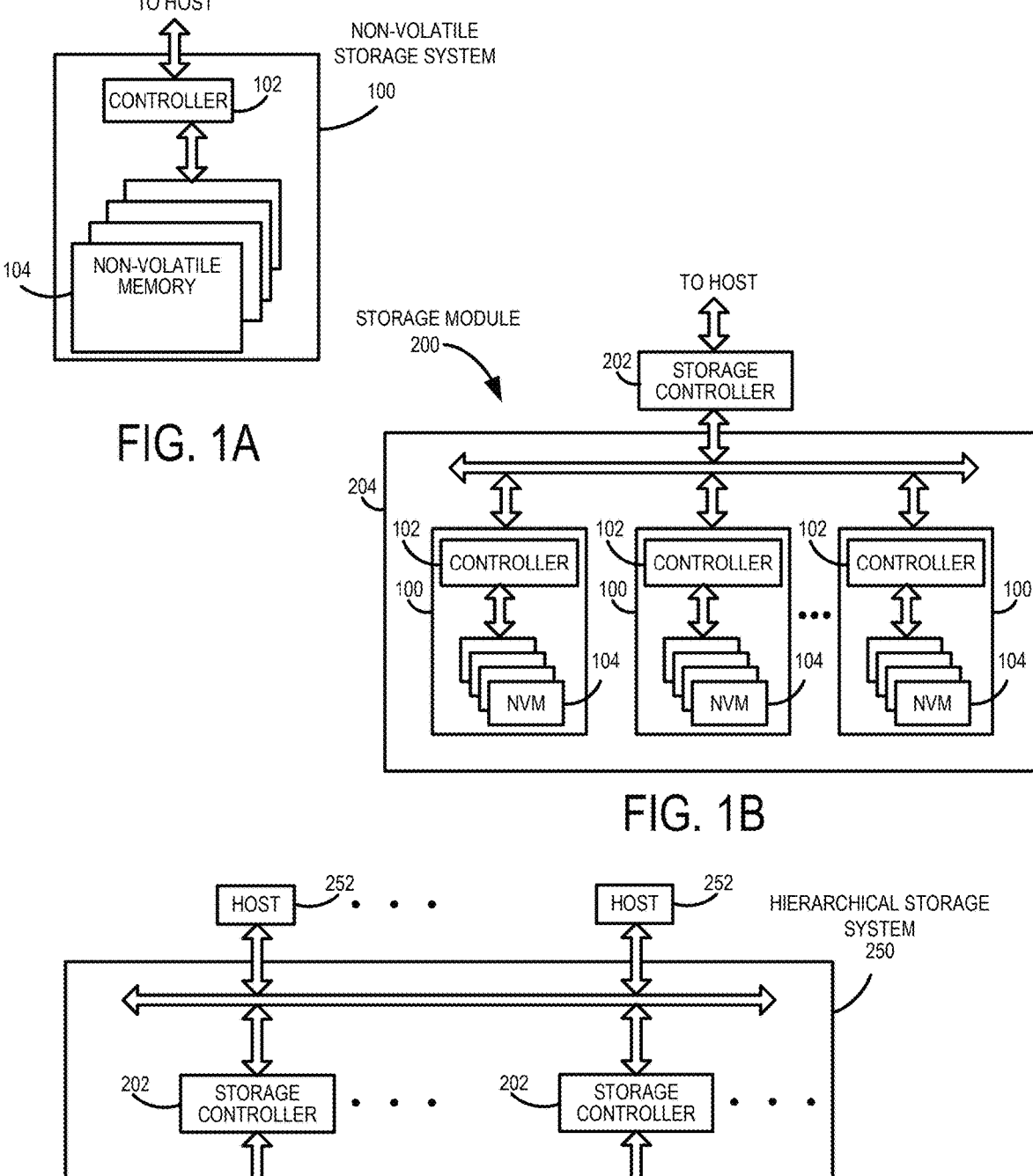
FIG. 1A is a block diagram of a data storage device of an embodiment.
FIG. 1B is a block diagram illustrating a storage module of an embodiment.
FIG. 1C is a block diagram illustrating a hierarchical storage system of an embodiment.

Examples of data storage devices suitable for use in implementing aspects of these embodiments are shown in FIGS. 1A-1C. It should be noted that these are merely examples and that other implementations can be used. FIG. 1A is a block diagram illustrating the data storage device 100 according to an embodiment. Referring to FIG. 1A, the data storage device 100 in this example includes a controller 102 coupled with a non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. The controller 102 interfaces with a host system and transmits command sequences for read, program, and erase operations to non-volatile memory die 104. Also, as used herein, the phrase "in communication with" or "coupled with" could mean directly in communication/coupled with or indirectly in communication/coupled with through one or more components, which may or may not be shown or described herein. The communication/coupling can be wired or wireless.

Figure 2A:
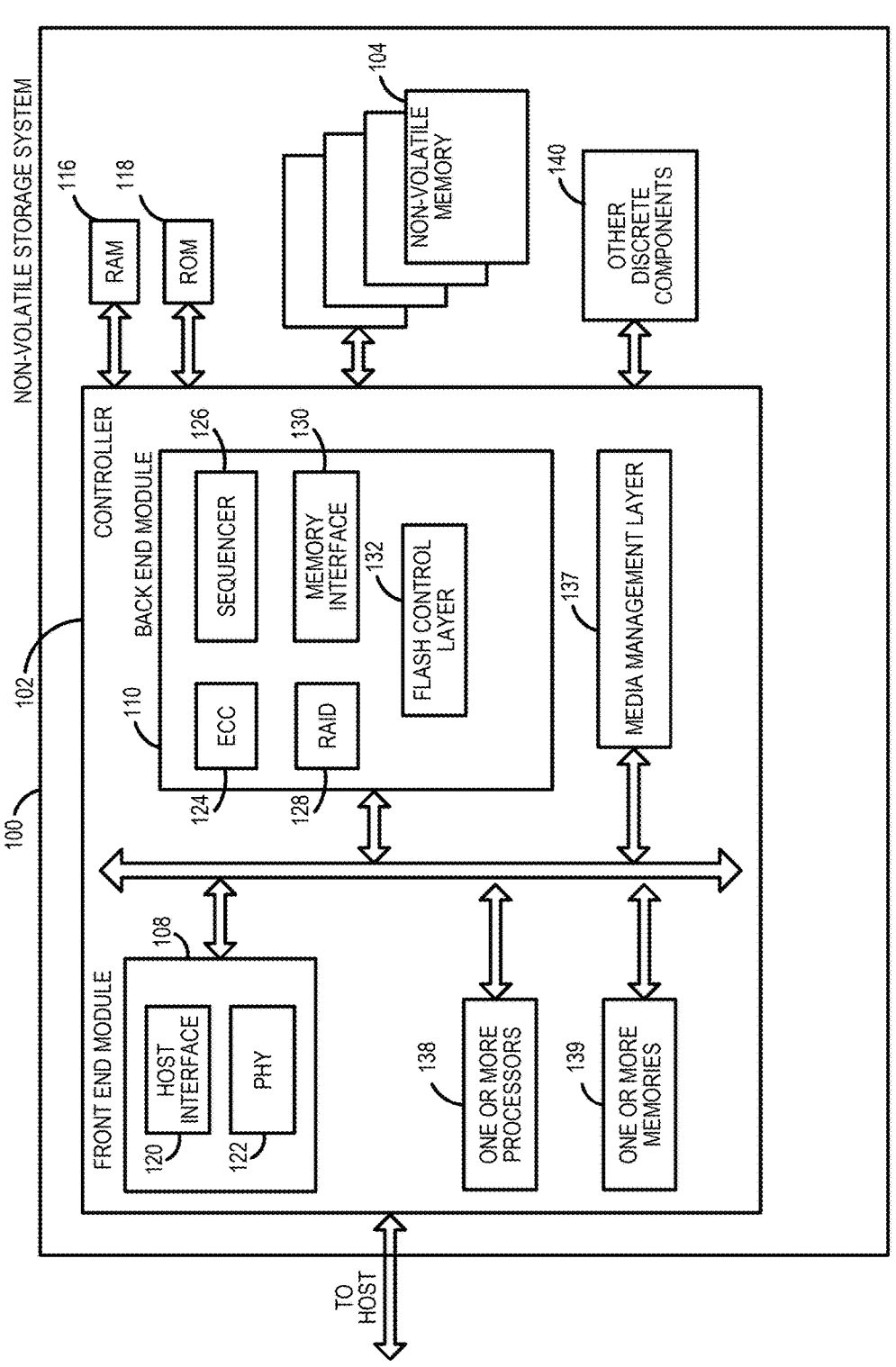
FIG. 2A is a block diagram illustrating components of the controller of the data storage device illustrated in FIG. 1A according to an embodiment.

The controller 102 (which may be a non-volatile memory controller (e.g., a flash, resistive random-access memory (ReRAM), phase-change memory (PCM), or magnetoresistive random-access memory (MRAM) controller)) can include one or more components, individually or in combination, configured to perform certain functions, including, but not limited to, the functions described herein and illustrated in the flow charts. For example, as shown in FIG. 2A, the controller 102 can comprise one or more processors 138 that are, individually or in combination, configured to perform functions, such as, but not limited to the functions described herein and illustrated in the flow charts, by executing computer-readable program code stored in one or more non-transitory memories 139 inside the controller 102 and/or outside the controller 102 (e.g., in random access memory (RAM) 116 or read-only memory (ROM) 118). As another example, the one or more components can include circuitry, such as, but not limited to, logic gates, switches, an application specific integrated circuit (ASIC), a programmable logic controller, and an embedded microcontroller.

In one example embodiment, the non-volatile memory controller 102 is a device that manages data stored on non-volatile memory and communicates with a host, such as a computer or electronic device, with any suitable operating system. The non-volatile memory controller 102 can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware (and/or other metadata used for housekeeping and tracking) to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card-based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, double-data-rate (DDR) interface, or serial attached small scale compute interface (SAS/SCSI). Storage module 200, in one embodiment, may be a solid-state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCOE) interface. In one embodiment, the system illustrated in FIG. 1C may be a rack mountable mass storage system that is accessible by multiple host computers, such as would be found in a data center or other location where mass storage is needed.

Referring again to FIG. 2A, the controller 102 in this example also includes a front-end module 108 that interfaces with a host, a back-end module 110 that interfaces with the one or more non-volatile memory die 104, and various other components or modules, such as, but not limited to, a buffer manager/bus controller module that manage buffers in RAM 116 and controls the internal bus arbitration of controller 102. A module can include one or more processors or components, as discussed above. The ROM 118 can store system boot code. Although illustrated in FIG. 2A as located separately from the controller 102, in other embodiments one or both of the RAM 116 and ROM 118 may be located within the controller 102. In yet other embodiments, portions of RAM 116 and ROM 118 may be located both within the controller 102 and outside the controller 102.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. The controller 102 in this example also comprises a media management layer 137 and a flash control layer 132, which controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller are optional components that are not necessary in the controller 102.

Figure 2B:
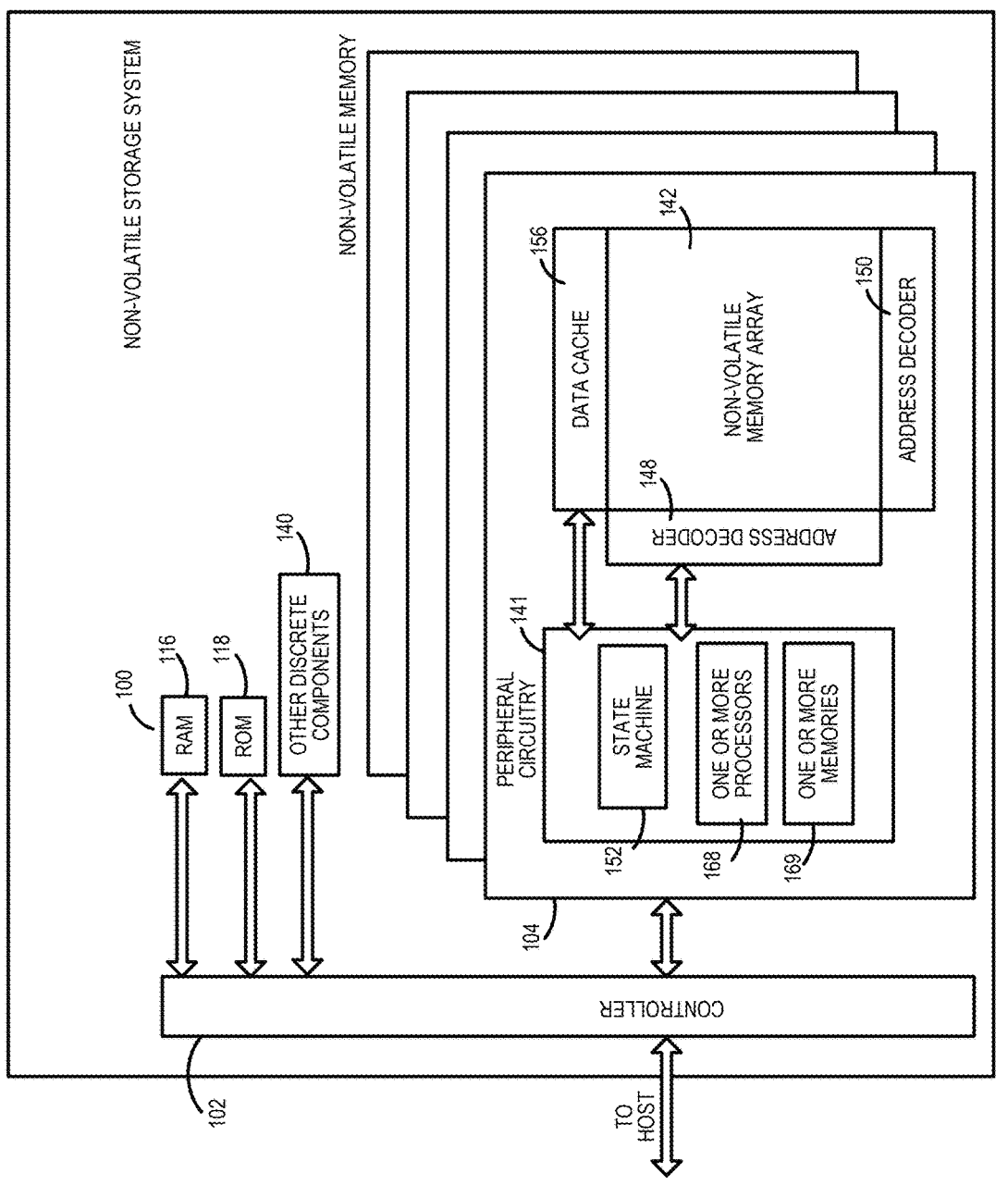
FIG. 2B is a block diagram illustrating components of the data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data and address decoders 148, 150. The peripheral circuitry 141 in this example includes a state machine 152 that provides status information to the controller 102. The peripheral circuitry 141 can also comprise one or more components that are, individually or in combination, configured to perform certain functions, including, but not limited to, the functions described herein and illustrated in the flow charts. For example, as shown in FIG. 2B, the memory die 104 can comprise one or more processors 168 that are, individually or in combination, configured to execute computer-readable program code stored in one or more non-transitory memories 169, stored in the memory array 142, or stored outside the memory die 104. As another example, the one or more components can include circuitry, such as, but not limited to, logic gates, switches, an application specific integrated circuit (ASIC), a programmable logic controller, and an embedded microcontroller.

In addition to or instead of the one or more processors 138 (or, more generally, components) in the controller 102 and the one or more processors 168 (or, more generally, components) in the memory die 104, the data storage device 100 can comprise another set of one or more processors (or, more generally, components). In general, wherever they are located and however many there are, one or more processors (or, more generally, components) in the data storage device 100 can be, individually or in combination, configured to perform various functions, including, but not limited to, the functions described herein and illustrated in the flow charts. For example, the one or more processors (or components) can be in the controller 102, memory device 104, and/or other location in the data storage device 100. Also, different functions can be performed using different processors (or components) or combinations of processors (or components). Further, means for performing a function can be implemented with a controller comprising one or more components (e.g., processors or the other components described above).

Returning again to FIG. 2A, the flash control layer 132 (which will be referred to herein as the flash translation layer (FTL) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
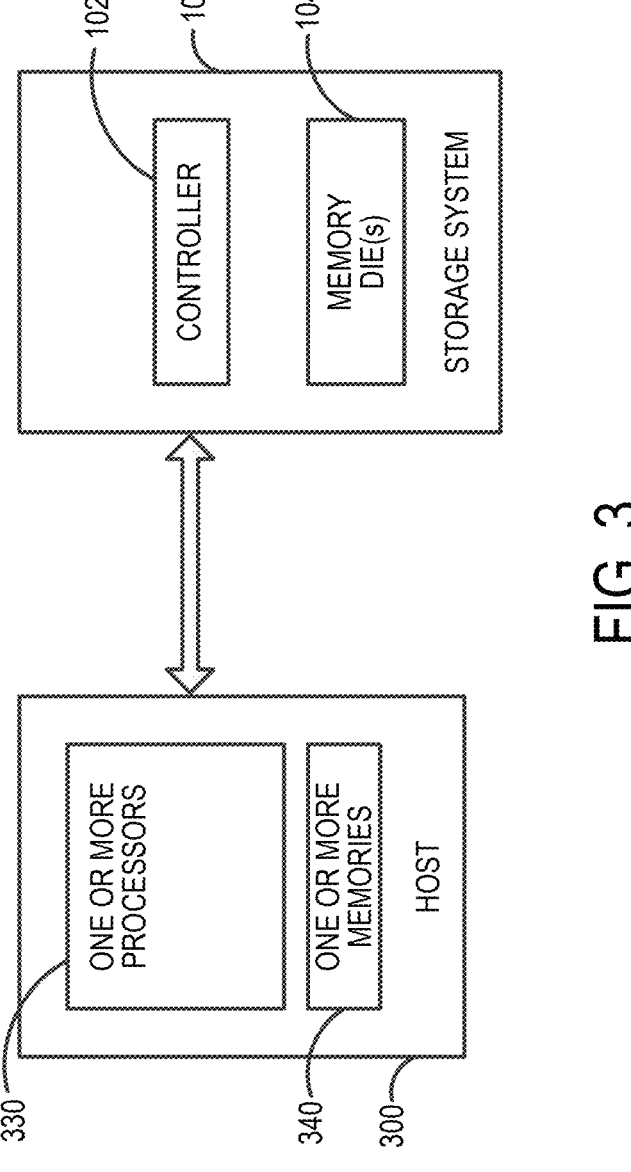
FIG. 3 is a block diagram of a host and a data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises one or more processors 330 and one or more memories 340. In one embodiment, computer-readable program code stored in the one or more memories 340 configures the one or more processors 330 to perform the acts described herein as being performed by the host 300. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

As mentioned above, computational resource requirements of artificial intelligence (AI) systems are typically high. A device that processes data and derives inferences using an AI engine should have sufficient computational, network, and storage bandwidth. Good storage throughput is desired to continuously feed data to an AI model so that it can perform optimally. In resource-constrained devices (such as security cameras, smart phones and edge devices), a lack of storage bandwidth can severely impact AI performance.

Quantization is one technique used by AI system designers to reduce data size of input or intermediate layers. In the quantization process, the precision of data is reduced by dropping the least-significant bits of the data. For example, a 32-bit data vector may be trimmed to a 16-bit data vector by removing the least-significant 16 bits of the individual vector elements. With quantization, the accuracy of the model output suffers, so it would be desirable to be able to switch quantization on and off depending on the system load and accuracy requirements.

Figure 4:
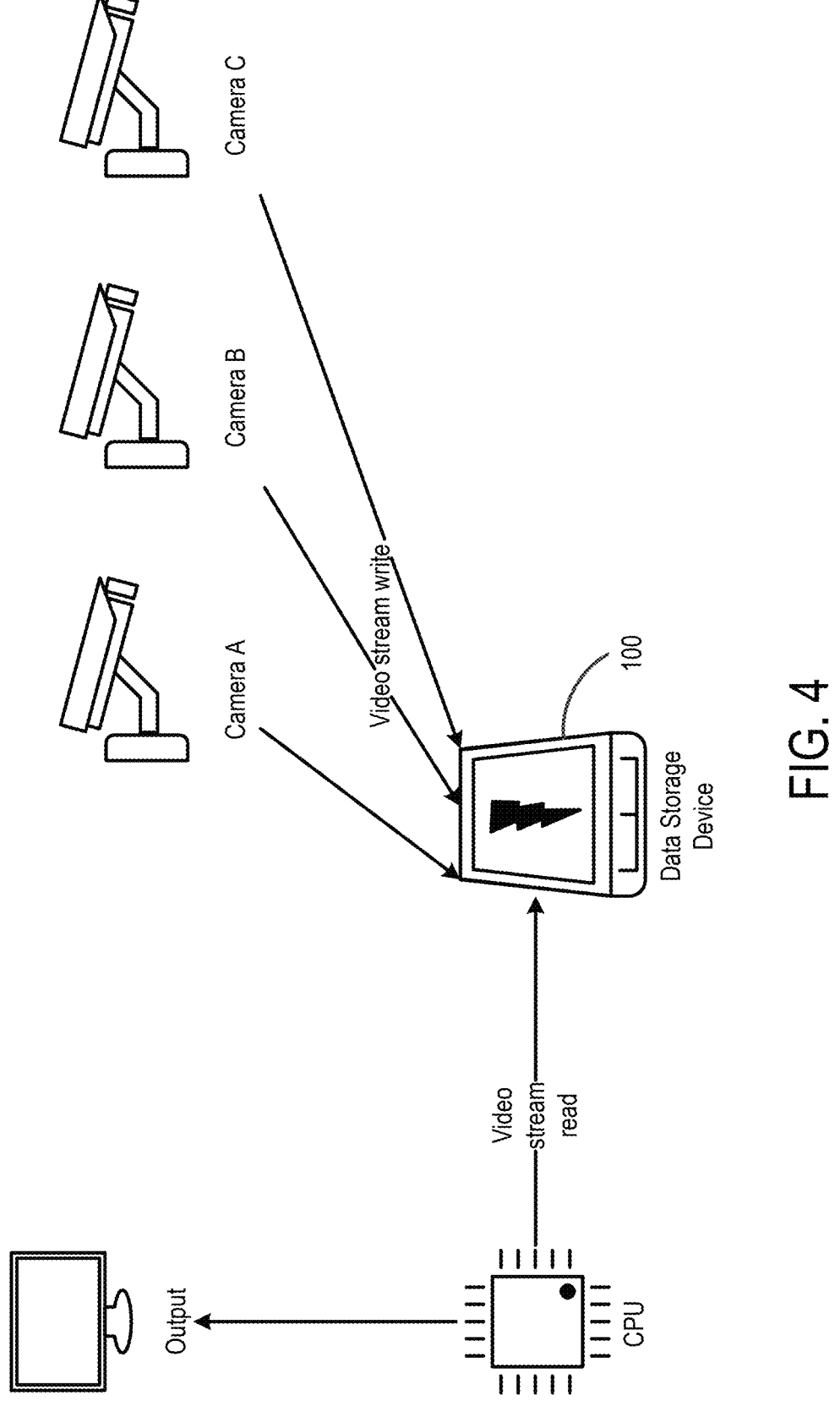
FIG. 4 is an illustration of a security system of an embodiment.

FIG. 4 is an illustration of a security system where on-demand quantization can be helpful. As shown in FIG. 4, the security system of this embodiment has multiple cameras (Cameras A, B, and C) that generate video streams, which are stored in a data storage device 100 in a raw format. A centralized central processing unit (CPU) or graphics processing unit (GPU) processes these data streams and generates inferences. When the system is idle and scanning for security breaches, each video data stream need not be analyzed in detail. The system can use quantized input data and smaller models to detect security incidents. This way, the system can process the output from a maximum number of cameras. When a security incident is detected, the system can stop using quantized data and select a data stream from a specific camera. This data can be used with full precision. A full-capacity AI model can process this data and generate more precise and detailed inferences.

In one embodiment, the data storage device 100 (which can be, for example, a NAND flash data storage device) can provide good speed and have a built-in capability to provide quantized or complete data based on a user requirement. Before turning to this capability, the following paragraphs will provide background on example memory cell technology that can be used in an example implementation.

In one embodiment, the memory 104 of the data storage device 100 can comprise matrices of storage (memory) cells. Each of these cells can be a single-level cell (SLC), which can store a single bit per cell. or a multi-level cell (MLC), which can store more than one bit per cell, based on the storage technology. When an MLC memory stores three or four bits per cell, the memory may be referred to as a triple-level cell (TLC) memory or a quad-level cell (QLC) memory, respectively. The following examples will be described in terms of QLC memory, but it should be understood that any suitable memory technology, now available or later developed, can be used.

There are multiple ways to store and retrieve data in QLC cells, which can be organized in pages and blocks. In this example, the write and read operations are performed at a page level, and a page is 16 KB. Four bits in a QLC cell belong to four pages: a lower page, a middle page, an upper page, and a top page. All four pages can be available when a write operation is performed in a QLC cell. The four-bit content of the QLC cell can be represented as a voltage value in the charge gate of the QLC cell. This voltage representation of bit values can be arranged in such a way that the individual bits of the stored number can be detected in a minimum steps of voltage sense operations.

FIG. 5 is a table of an example coding scheme of an embodiment for reading QLC cell contents. In this coding scheme, a 4–4–3–4 mechanism is used to read the full contents of the cell. In a 4–4–3–4 mechanism, the lower, middle, and top pages can be read by sensing the cell voltage in four steps, whereas the upper page can be read by sensing the cell voltage in three steps.

Figure 6:
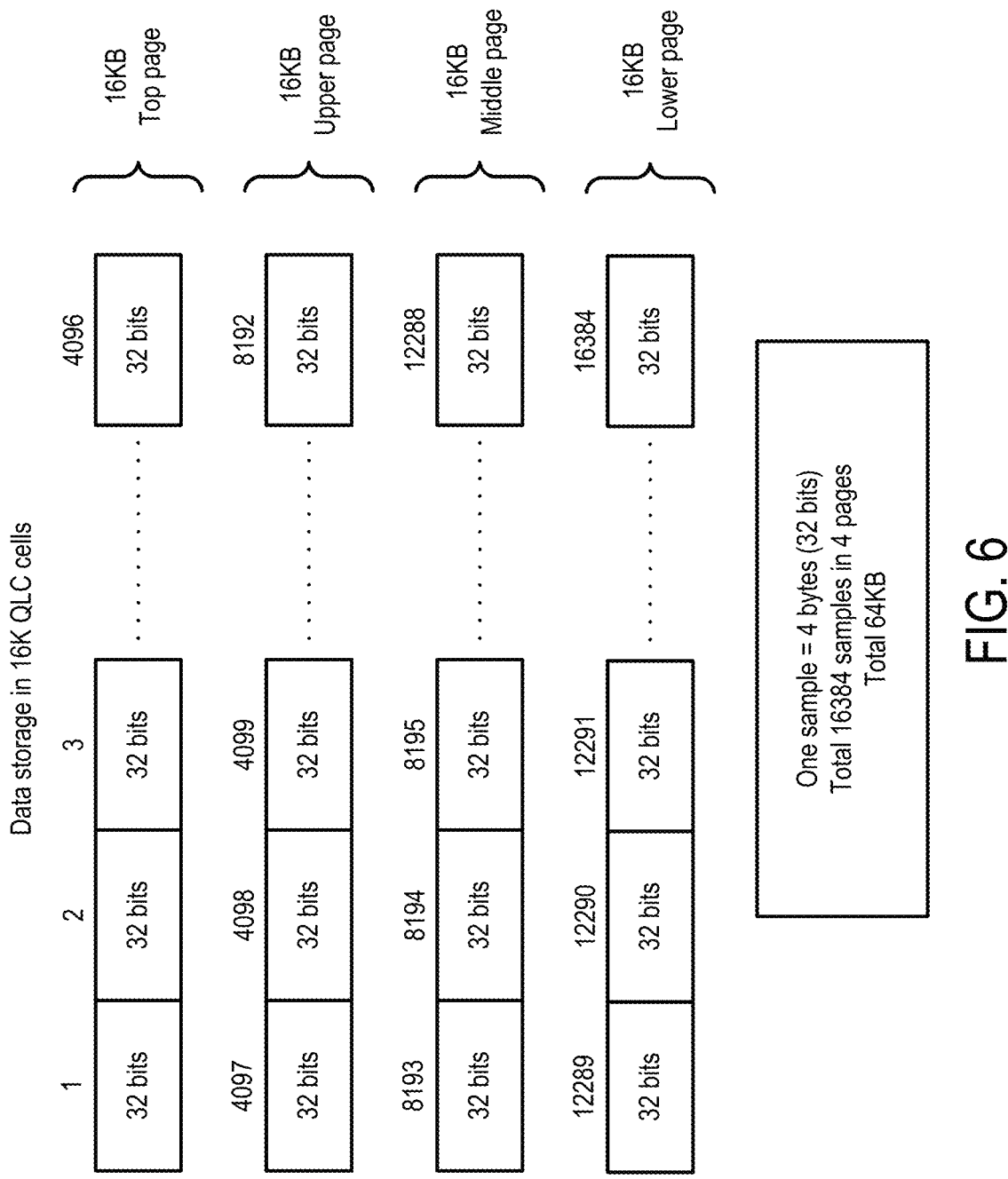
FIG. 6 is an example of data storage in quad-level cell (QLC) pages of an embodiment.

FIG. 6 is an example of data storage in QLC pages of an embodiment. In this example, there are four 16 KB pages. Each page can hold 4,096 samples of data, where each sample (e.g., a single element of a 32-bit vector) is 32 bits. FIG. 7 is a table showing an example of how four 32-bit samples can be stored. In this example, each sample is stored in 32 cells, and each bit is stored in a separate cell.

With this background now provided, the following paragraphs will describe embodiments in which the data storage device 100 is used to provide direct data quantization in multi-level cell memory, such as quad-level cell memory. This can be beneficial to AI systems. In current AI systems, the complete data set is loaded into volatile memory (e.g., RAM) from a data storage device. The data is trimmed to a desired level by software using a quantization operation and is then fed to an AI model. AI frameworks (e.g., Tensor-Flow) also provide methods to embed quantization layers into the model. Quantization at the software level or flash translation layer (FTL) level in a data storage device may not be optimal, and the following embodiments can be used to help optimize quantization directly in the memory level itself to further reduce memory senses and data channel transfers.

In one embodiment, the controller 102 of the data storage device 100 is configured to take data bits, dynamically interleave them, and encode them byte-wise across different pages during memory programming such that, in the retrieval path, the data storage device 100 has the flexibility and option to retrieve a quantized most-significant portion of data using a smaller number of QLC memory senses than for the same amount of sample set/machine-learning parameters, thereby improving read performance. In some cases, this data encoding scheme is triggered only if the controller 102 (e.g., the FTL) determines that the application use case does not need high precision data; otherwise, the controller 102 can perform typical encoding for rest of the data. In other words, the QLC encoding and write data interleaving for memory writes of this embodiment can be such that there is only one copy of stored data during program, and the number of NAND senses is conditionally (and dynamically) reduced for a QLC memory cell to fetch a quantized portion of data based on need. While this example is described in terms of QLC, as noted above, these embodiments can be used with any suitable number of multi-level cells with appropriate modification.

FIG. 8 illustrates an example data interleaving schedule for a 32-bit fixed-point data sample. It should be noted that these embodiments can be used for multiple sample sets in a page (e.g., multiple 32-bit data samples can be stored in lower, middle, upper, and top pages). For simplicity, one 32-bit sample will be used in this example to illustrate the mechanism in both the write and read paths.

As shown in FIG. 8, in this example, the least-significant eight bits are encoded as a part of the lower page, the next eight bits are encoded as a part of the middle page, the next eight bits are encoded as a part of the upper page, and the next eight bits (which are the most-significant bits) are encoded as a part of the top page. As mentioned above with reference to FIG. 5, in a 4-4-3-4 coding mechanism, the lower, middle, and top pages can be read by sensing the cell voltage in four steps, whereas the upper page can be read by sensing the cell voltage in three steps. So, with the data interleaving schedule of this embodiment, the data storage device 100 only needs to perform seven senses (i.e., four for the top page and three for the upper page) to fetch the quantized most-significant 16 bits, as opposed to 15 senses to fetch all of the pages. In one example implementation, the data storage device 100 can comprises a hardware module (e.g., in the controller 102 or separate from the controller 102) configured to perform data interleaving to optimize a write pipeline.

As shown by this example, one advantage of this embodiment is that a greater number of samples can be retrieved (since quantized) with the same level of memory senses, since only the most-significant bit (MSB) portion is retrieved by sensing the associated pages (e.g., in this example, sensing the upper and top pages would cover the entire sample set). However, the advantage of more data per sense or less sense time for the same data is interchangeably used herein since the return on investment is similar.

In another embodiment, the controller 102 can perform encoding and data interleaving to optimally fetch coarse data, which may be a requirement in various media and artificial intelligent/machine learning (ML) applications. As shown in FIG. 9, in this embodiment, the controller 102 can associate the eight most-significant bits to the upper page (and not the top page), thereby enabling the controller 102 and memory 104 to fetch the coarse data with just three senses (and not four senses). This amount of data may be desired for certain use cases to analyze just the "ballpark" of the stored data, such as when the stored data comprises AI/ML model weights. Performance is optimized since the finer data need not be fetched from the memory 104 for the underlying operations. For example, if the stored image data is in a red-green-blue (RGB) format, the quantized eight most-significant bits may be more than sufficient to create a preview of the image.

In this example, the eight most-significant bits were stored in the upper page because the upper page required the fewest number of senses. In other examples, a page other than the upper page can require the fewest number of senses, and the most-significant bits can be stored in that page (because it has the least access latency among the set of pages). This can be the case, for example, if a different memory encoding scheme or a different memory design is used, such that the top page is not the least latency page.

In another embodiment, the controller 102 is configured to dynamically determine the variable amount of quantization required and perform the associated number of memory senses according to the memory in use. For example, with QLC, the controller 102 can instruct the memory 104 to perform 11 senses (4+3+4) to retrieve a 24-bit variant of the stored data, if the controller 102 (e.g., FTL) determines that higher precision is required than provided with the 16-bit method described above (but lower than the typical, full 32-bit method) for application use cases.

There are several use cases for these embodiments. In one example use case, these embodiments are used in a compute-storage system, in which the data storage device 100 has one or many accelerator cores. In such a system, the controller 102 (e.g., FTL) can be configured to perform data interleaving and memory encoding for at least one of the in-house accelerators if the controller 102 determines that the core has a use case to retrieve low-precision data. Thus, the controller 102 can trade-off a higher quality of service (QoS) for lower precision for the corresponding computations. During a retrieval request, if the controller 102 determines or is instructed by the compute-core that the core needs lower precision data, the controller 102 can instruct the memory 104 to use a lower number of senses to fetch the quantized data (e.g., the MSB bits) sufficient for the ongoing computations, thereby improving compute QoS in a compute-storage device. As an example, the accelerator core can be a video processing engine that can operate on media data. In another example, the accelerator can be an AI/ML core that executes training and inference in the data storage device 100. As seen by these examples, this method can have no host-dependency and can be implemented internally in the data storage device 100.

In another example use case, these embodiments are used with CBA (CMOS directly bonded to array) memory, where direct quantization can help efficient use of cache resources owing to a smaller number of pages to be processed for the quantized data set as compared to legacy approaches. In yet another example use case, the controller 102 of the data storage device 100 can apply the data interleaving and retrieval techniques for some GPUs connected to the memory. As an example, the data storage device 100 can incorporate these techniques to save power or reduce thermal impacts if the system determines that the associated algorithm (e.g., of a GPU) is such that it involves substantial data retrieval and/or if a lower precision is sufficient.

In another example use case, the controller 102 of the data storage device 100 can apply the data interleaving and retrieval techniques only for some logical regions, such as an endurance group in a NVMe device, based on a host hint and a predetermined agreement. This method can have host dependency, and changes can be based to the host interface.

The following paragraphs provide an example implementation of an embodiment for providing on-demand quantization support in a QLC technology-based NAND storage device. The write and read methods can be modified to support on-demand quantization with improved performance. It should be noted that this is merely one example and that other implementations can be used. As such, the details provided herein should not be read into the claims unless expressly recited therein.

In this example, data storage in the QLC cells can be optimized so that quantization can be performed optimally on user request. Suppose the host 300 has some data stream that needs to be stored in the memory 104 of the data storage device 100. The data stream can be stored in such a way that it can be read in full precision or in a quantized format. The host 300 sends a write request to the data storage device 100, in response to which the controller 102 of the data storage device 100 splits the data in such a way that a 32-bit value in the data vector is split into four pages. These pages are then written to the QLC cell. FIG. 10 is a table that shows the split of 32-bit data into eight QLC cells.

Figure 11:
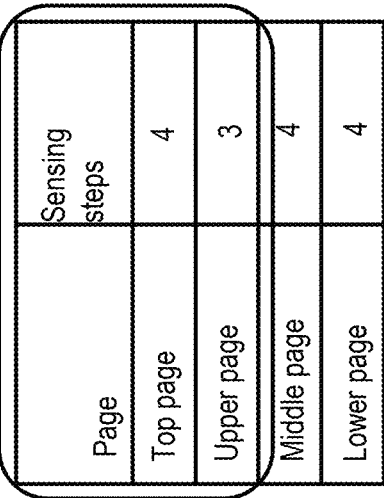
FIG. 11 is a table illustrating a number of sensing steps needed to read 16-bit quantized data in an embodiment.

Suppose that the host 300 desires to read this data in 16-bit quantized format. When 16-bit quantized data is required, the data storage device 100 needs to read only the top and upper pages. A 64 KB vector can be converted to a 32 KB vector after 16-bit quantization. A 16-bit quantized read request of such a vector can be completed in 4+3=7 steps. A 64 KB vector in full precision can require 4+4+3+4=15 steps. This step number is the same as that of a normal read operation. FIG. 11 is a table showing the number of sensing steps needed to read 16-bit quantized data. It should be noted that the example 4–4–3–4 encoding can have a different latency for page accesses compared to other encoding, and the embodiments can be modified for a different encoding. For example, in some encoding schemes, say 3–4–4–4, the lower page would have the least-latency-oriented access.

Figure 12:
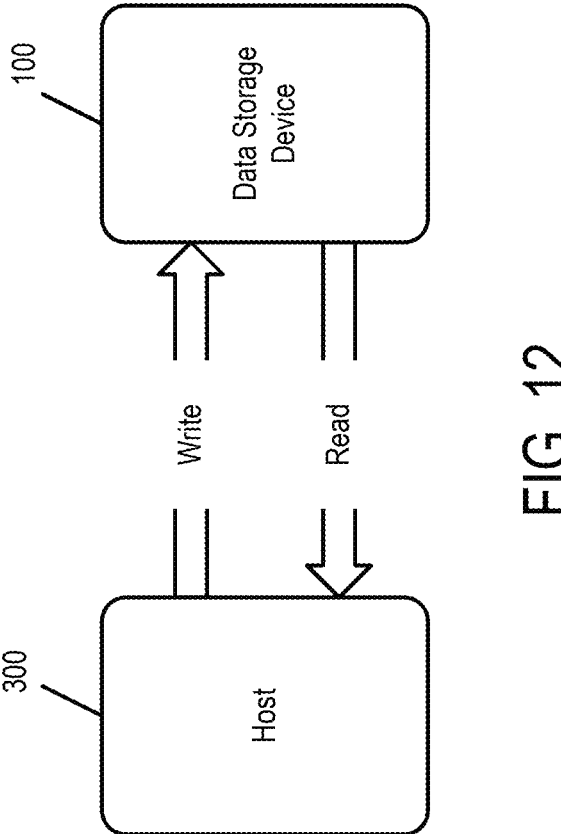
FIG. 12 is an illustration of a host and a data storage device of an embodiment.

As shown in FIG. 12, the host 300 and the data storage device 100 can communicate write requests and read data. The data storage device 100 can share the quantized or full data set with the host 300 based on a pre-determined method. Two such methods are described below, but any other suitable method can be used. For the sake of simplicity, it is assumed that the data is written in a 32-bit vector size. A full-precision read operation retrieves the data in the same 32-bit vector format. A quantized read operation retrieves the data in 16-bit vector format. But the same concept can be extended when the quantization is required in a 24- or 8-bit vector size.

Figure 13:
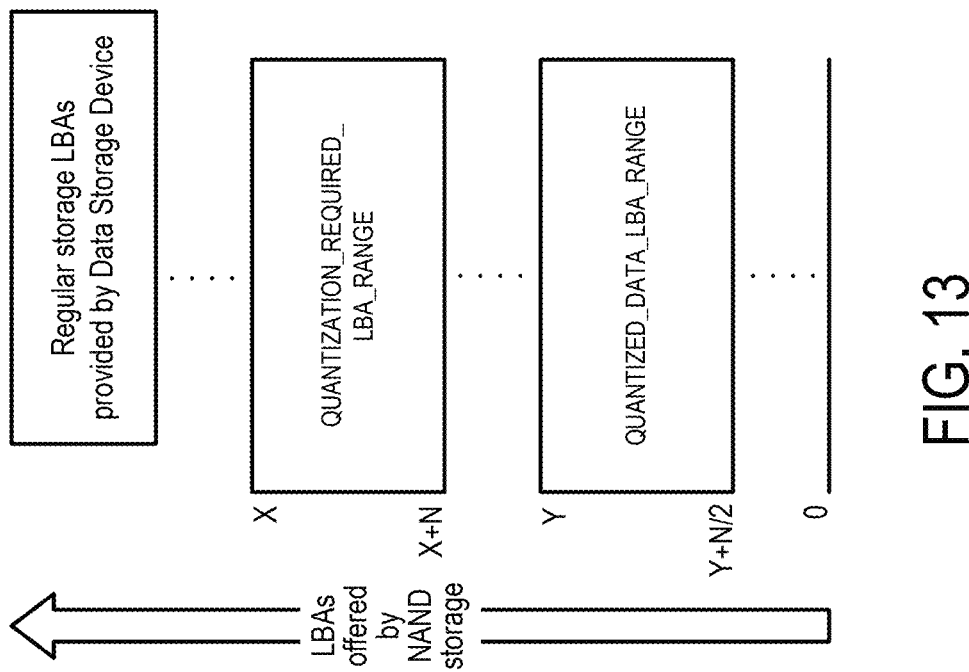
FIG. 13 is an illustration of a communication method of an embodiment.

One host communication method uses a special logical block address (LBA) range for quantized data. In this configuration, the data storage device 100 acts as AI/ML specialized storage device. With reference to FIG. 13, in this method, a range of LBAs are reserved for writing the data for which quantization may be required. This LBA range can be called as QUANTIZATION_REQUIRED_LBA_RANGE. It starts at X LBA, and total number of LBAs in this range are N. Another range of LBAs (QUANTIZED_DATA_LBA_RANGE start: Y, length: N/2) provides 16-bit quantized data. These are read-only LBAs in this example.

The host 300 can write data vectors into the QUANTIZATION_REQUIRED_LBA_RANGE LBA range. This data can be stored into the memory 104 of the data storage device 100 using the write method described above. If there are 32-bit data vectors in this range, the total number of vector elements that can be stored can be calculated using the following formula: Max number of vector elements= (N*size of LBA in bytes)/4. The host 300 can read the written data in full precision if it issues a read command in the QUANTIZATION_REQUIRED_LBA_RANGE LBA range. The data will be retrieved in a 32-bit vector size. When the host 300 desires to read the data in a 16-bit quantized format, the host 300 can issue a read command in the QUANTIZED DATA_LBA_RANGE range, and the data storage device 100 can provide the data in the 16-bit quantized format.

Figure 14:
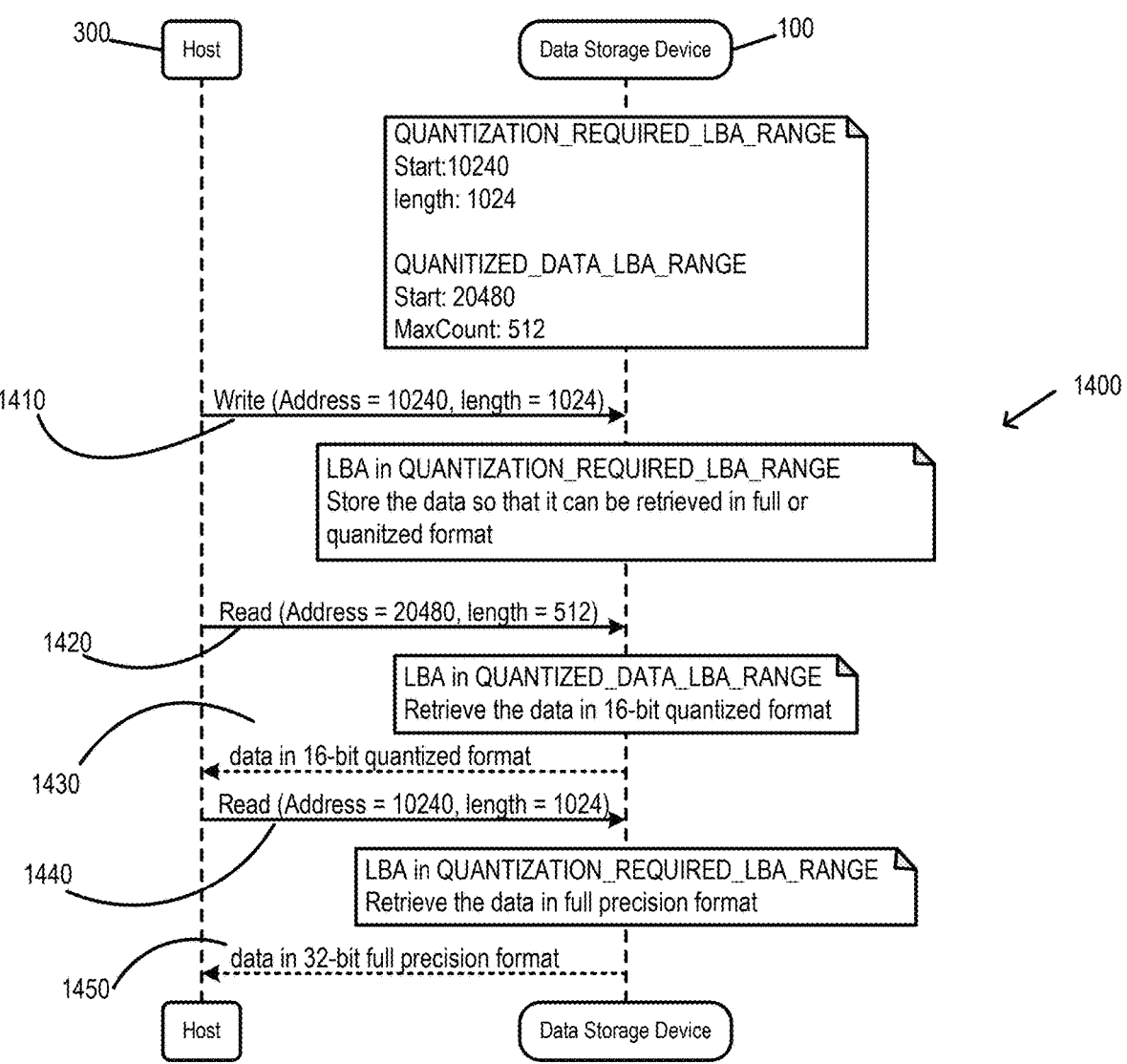
FIG. 14 is a flow sequence diagram of an embodiment.

FIG. 14 is a flow sequence diagram 1400 of an embodiment that shows write and read operations in this configuration. As shown in FIG. 14, in this embodiment, the host 300 sends a write command (1410) to the data storage device 100, which triggers the controller 102 of the data storage device 100 to store data in the memory 104 in such a way that it can be retrieved in a full format or in a quantized format. Next, the host 300 sends a read command (1420), which triggers the controller 102 of the data storage device 100 to retrieve the data from the memory 104 in a 16-bit quantized format. The controller 102 then returns the data to the host 300 (1430). The host 300 then sends another read command (1440), which triggers the controller 102 of the data storage device 100 to retrieve data from the memory 104 in a full-precision format. The controller 102 then returns the data to the host 300 (1450).

Figure 15:
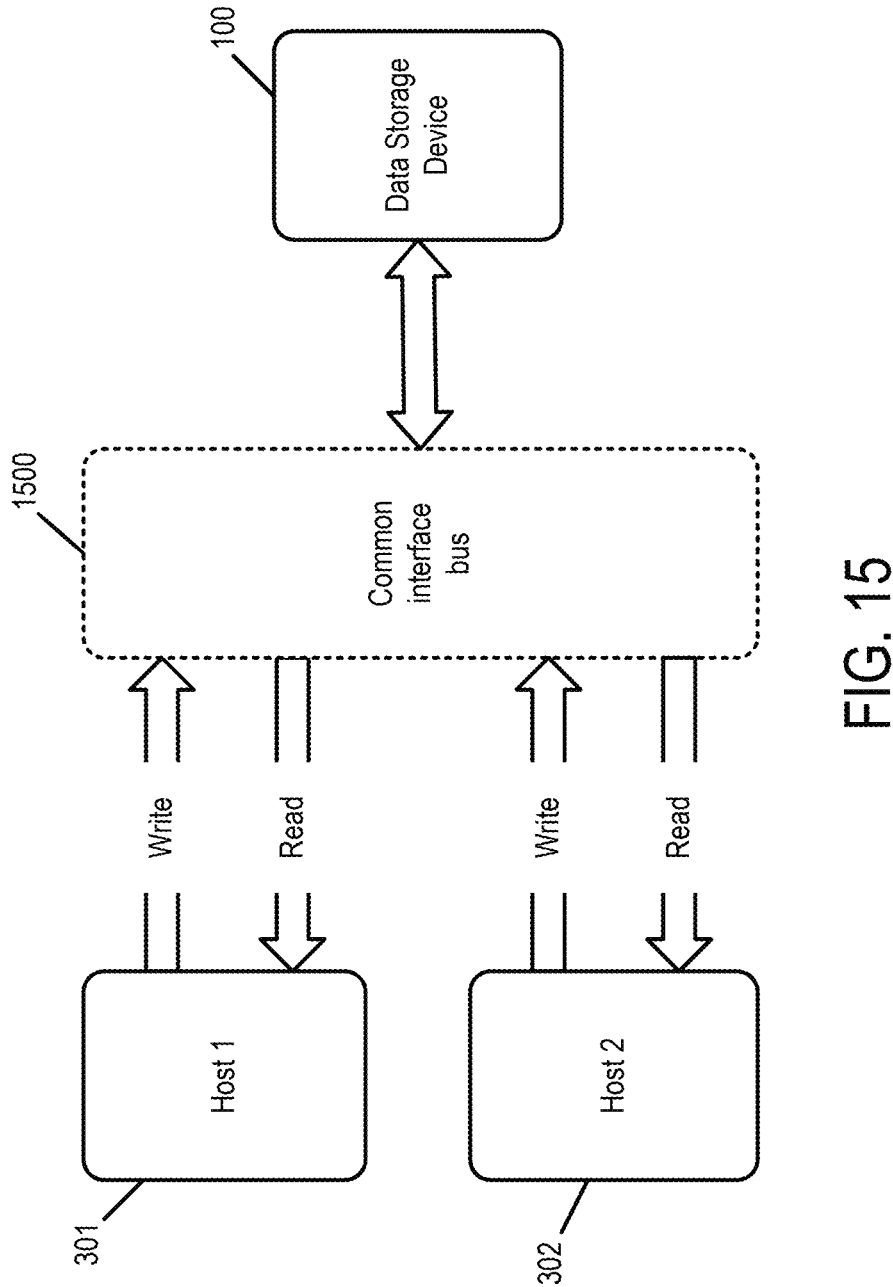
FIG. 15 is an illustration of hosts and a data storage device of an embodiment.

Turning now to FIG. 15, another host communication method involves multiple hosts 301, 302 that communicate with the data storage device 100 via a communication bus interface 1500. In this configuration, the data storage device 100 acts as an AI/ML-specialized data storage device. The hosts 301, 302 are connected to the data storage device 100 through an interface, such as NVMe, that supports multiple hosts. Some hosts may require full precision data, and some hosts may require quantized data. The preference of the hosts is known to the data storage device 100 and can be configured using vendor-specific commands. Data can be written to the memory 104 of the data storage device 100 using the write method described above.

In this example, host 302 needs quantized data, and host 301 needs full-precision data. When host 302 sends a read request, the controller 102 of the data storage device 100 identifies the host and returns 16-bit quantized data. However, when the host 301 sends a read request, the controller 102 of the data storage device 100 identifies the host and returns the full-precision data. This is illustrated in the flow sequence diagram 1600 in FIG. 16.

Figure 16:
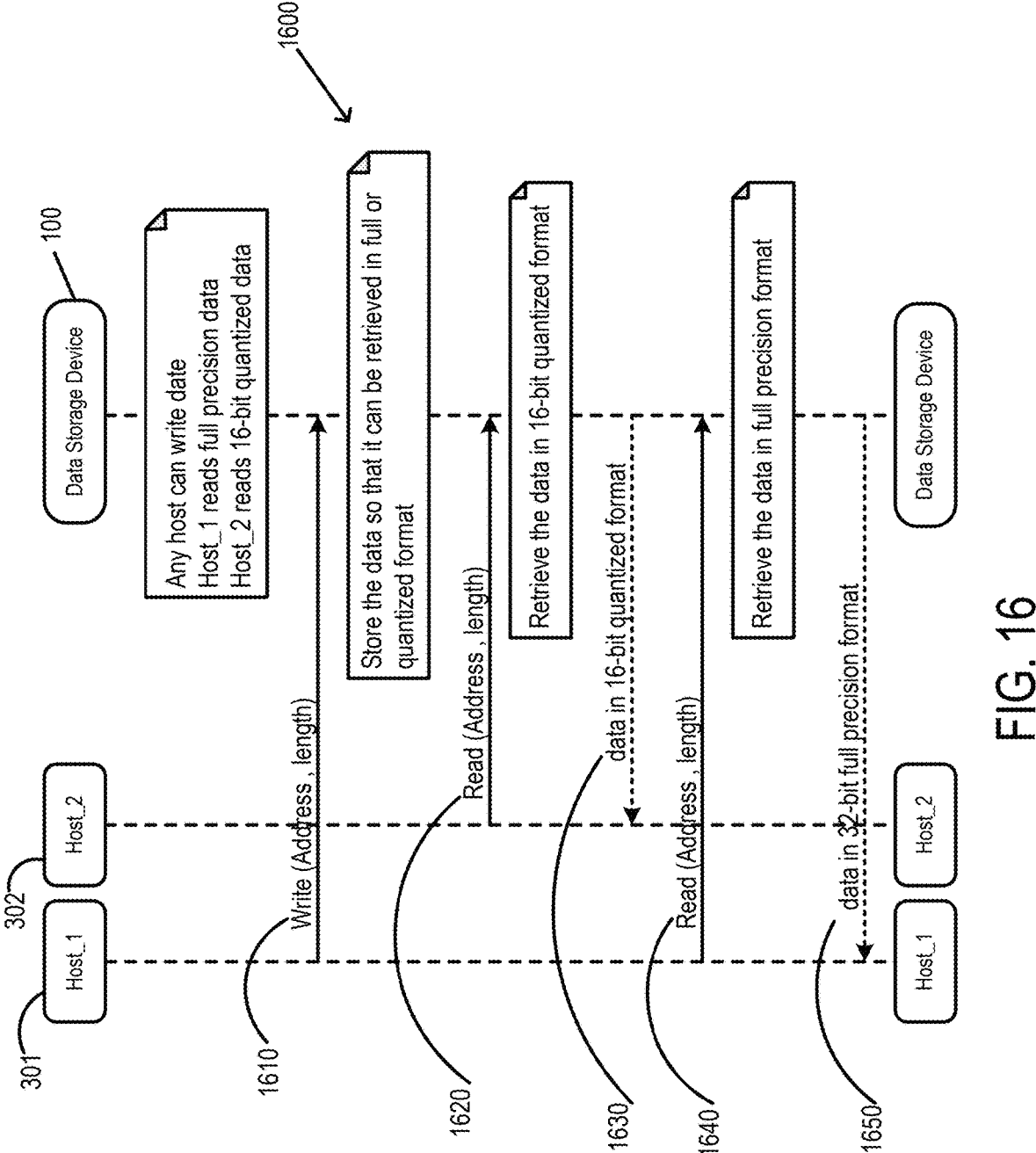
FIG. 16 is a flow sequence diagram of an embodiment.

As shown in FIG. 16, in this embodiment, host 301 sends a write command (1610) to the data storage device 100, which triggers the controller 102 of the data storage device 100 to store data in the memory 104 in such a way that it can be retrieved in full or in a quantized format. Next, host 302 sends a read command (1620), which triggers the controller 102 of the data storage device 100 to retrieve the data from the memory 104 in a 16-bit quantized format. The controller 102 then returns the data to host 302 (1630). Host 301 then sends a read command (1640), which triggers the controller 102 of the data storage device 100 to retrieve data from the memory 104 in a full-precision format. The controller 102 then returns the data to host 301 (1650).

There are several advantages associated with these embodiments. For example, with at least some implementations of these embodiments, a data storage device can halve the memory read time for a quantized data read request, which can lead to performance improvement during the times when the data storage device does not require highly-accurate precision but more data processing. At least some implementations of these embodiments can support full-precision data if a user so desires. Also, at least some of these embodiments can be implemented without any special error-handling requirements (e.g., legacy error-handling techniques may be sufficient). Further, at least some of these embodiments can be a marketable feature of data storage devices for AI systems. Requirements for on-device AI are growing, and at least some of these embodiments can be used to provide storage performance improvement to resource-constrained devices. Also, as NAND scales in future, meeting the performance requirements and minimizing the energy consumption per bit can vastly add value to storage products.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two-dimensional configuration, e.g., in an x-z plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
a memory comprising multi-level memory cells; and
one or more processors, individually or in combination, configured to:
  receive a request to store data;
  store the data in the multi-level memory cells, wherein each bit of a set of most-significant bits of the data is stored in a same memory cell level in each respective multi-level memory cell;
  in response to receiving a request to read a quantized version of the data, read the set of most-significant bits of the data stored in the same memory cell level of each respective multi-level memory cells without reading other bits of the data stored in at least one other memory cell level of the multi-level memory cells; and
  in response to receiving a request to read a non-quantized version of the data, read the other bits of the data stored in the at least one other memory cell level of the multi-level memory cells;
  wherein the other bits of the data stored in the at least one other memory cell level of the multi-level memory cells are read when the non-quantized version of the data is read but not when the quantized version of the data is read.

2. The data storage device of claim 1, wherein:
the set of most-significant bits of the data is stored in a first memory cell level of each respective multi-level memory cell;
each bit of a set of next-most-significant bits of the data is stored at a second memory cell level in each respective multi-level memory cell; and
the one or more processors, individually or in combination, are further configured to read both the set of most-significant bits of the data and the set of next-most-significant bits of the data in response to receiving the request to read the quantized version of the data.

3. The data storage device of claim 1, wherein the one or more processors, individually or in combination, are further configured to:

in response to receiving the request to read the non-quantized version of the data:

read the set of most-significant bits of the data from the same memory cell level in each respective multi-level memory cells; and read other bits of the data from other memory cell levels of the multi-level memory cells.

4. The data storage device of claim 1, wherein:

the multi-level memory cells comprise quad-level cells; and the set of most-significant bits of the data is stored in a page of the quad-level cells that requires a fewest number of memory senses.

5. The data storage device of claim 4, wherein:

a set of next-most-significant bits of the data is stored in an upper page of the quad-level cells.

6. The data storage device of claim 1, wherein:

the multi-level memory cells comprise quad-level cells; and the set of most-significant bits of the data is stored in an upper page of the quad-level cells.

7. The data storage device of claim 1, wherein each bit of the set of most-significant bits of the data is stored in the same memory cell level in each respective multi-level memory cell in response to the request specifying a logical block address that is in a designated logical block address range.

8. The data storage device of claim 1, wherein each bit of the set of most-significant bits of the data is stored in the same memory cell level in each respective multi-level memory cell in response to the request being received from a designated host.

9. The data storage device of claim 1, wherein the data storage device is an artificial intelligence/machine learning (AI/ML) specialized data storage device.

10. The data storage device of claim 1, wherein the data storage device is part of a security system.

11. The data storage device of claim 1, wherein the memory comprises a three-dimensional memory.

12. In a data storage device comprising multi-level memory cells, a method comprising:

receiving a request to store data;

storing the data in the multi-level memory cells, wherein each bit of a set of most-significant bits of the data is stored in a same memory cell level in each respective multi-level memory cell;

in response to receiving a request to read a quantized version of the data, reading the set of most-significant bits of the data stored in the same memory cell level of each respective multi-level memory cells without reading other bits of the data stored in at least one other memory cell level of the multi-level memory cells; and in response to receiving a request to read a non-quantized version of the data, reading the other bits of the data stored in the at least one other memory cell level of the multi-level memory cells;

wherein the other bits of the data stored in the at least one other memory cell level of the multi-level memory cells are read when the non-quantized version of the data is read but not when the quantized version of the data is read.

13. The method of claim 12, further comprising:

in response to receiving the request to read the non-quantized version of the data:

sensing all memory cell levels in the multi-level memory cells; and responding to the request to read the non-quantized version of the data by returning bits sensed from all of the memory cell levels in the multi-level memory cells.

14. The method of claim 12, wherein:

the multi-level memory cells comprise quad-level cells; and the set of most-significant bits of the data is stored in a page of the quad-level cells that requires a fewest number of memory senses.

15. The method of claim 14, wherein:

a set of next-most-significant bits of the data is stored in an upper page of the quad-level cells.

16. The method of claim 12, wherein:

the multi-level memory cells comprise quad-level cells; and the set of most-significant bits of the data is stored in an upper page of the quad-level cells.

17. The method of claim 12, wherein each bit of the set of most-significant bits of the data is stored in the same memory cell level in each respective multi-level memory cell in response to a write request for the data specifying a logical block address that is in a designated logical block address range.

18. The method of claim 12, wherein each bit of the set of most-significant bits of the data is stored in the same memory cell level in each respective multi-level memory cell in response to a write request for the data being received from a designated host.

19. A data storage device comprising:

a memory comprising multi-level memory cells; and means for:

receiving a request to store data;

storing the data in the multi-level memory cells, wherein each bit of a set of most-significant bits of the data is stored in a same memory cell level in each respective multi-level memory cell;

in response to receiving a request to read a quantized version of the data, reading the set of most-significant bits of the data stored in the same memory cell level of each respective multi-level memory cells without reading other bits of the data stored in at least one other memory cell level of the multi-level memory cells; and in response to receiving a request to read a non-quantized version of the data, reading the other bits of the data stored in the at least one other memory cell level of the multi-level memory cells;

wherein the other bits of the data stored in the at least one other memory cell level of the multi-level memory cells are read when the non-quantized version of the data is read but not when the quantized version of the data is read.

* * * * *